# United States Patent Office 2,882,200
Patented Apr. 14, 1959

2,882,200

COMPOSITION COMPRISING 3-METHYLPENT-1-ENE-4-YNE-3-OL AND PROCESS OF INDUCING HYPNOSIS THEREWITH

Abraham Bavley, Brooklyn, and Morton Harfenist, Yonkers, N.Y., assignors to Chas. Pfizer & Co., Inc., New York, N.Y., a corporation of Delaware No Drawing. Application April 26, 1956
Serial No. 580,719

4 Claims. (Cl. 167—52)

This invention relates to compositions useful in the treatment of certain human and animal illnesses. In particular, this invention relates to compositions in which the active ingredient is methyl vinyl ethinyl carbinol or, more strictly speaking, 3-methylpent-1-ene-4-yne-3-ol. This application is a continuation-in-part of our copending application Serial No. 296,744, filed July 1, 1952, and now abandoned.

Compositions which possess strong hypnotic action, together with low toxicity and ease of administration, are valuable pharmaceutical materials. In particular, products of this nature should be administrable by mouth in a form which is palatable and causes no appreciable gastric disturbance and which can be administered even to children over prolonged periods without development of a repugnance to the product.

Although in certain groups of compounds it is possible to show a relationship between structure and biological activity, no such relationship exists in many groups of structurally similar substances. In addition, a given drug may have a certain effect, such as hypnosis, whereas a second drug of closely related structure may have little or no hypnotic activity.

It has been found that when 3-methylpent-1-ene-4-yne-3-ol is incorporated into certain orally administrable pharmaceutical preparations it is a particularly effective agent in bringing about sedation of the subject. The new, orally administrable compositions of this invention are particularly useful for the treatment of animals when hypnosis or sedation is desired. The active ingredient may be compounded with various carriers which serve to present the material in a form which can be administered repeatedly without developing aversion to the product. In particular, it is preferred to administer the product in vehicles containing liquid pharmaceutical carriers. For instance, aqueous media containing sweetening agents or sweetening and flavoring agents are very useful. Other non-toxic liquid pharmaceutical carriers such as glycerin, propylene glycol and so forth with or without water, may be used. The tertiary carbinol has a characteristic olefin-like odor and taste which many people find very unpleasant. When the carbinol is used in a liquid carrier, it is advisable to have a mixture which is from moderately acidic to basic. A pH in the range of from about 3 to about 9 is suitable. Strongly acidic conditions tend to cause the compound to rearrange. The compound may be administered in pure form or in various liquid vehicles in capsules. The compound may also be injected subcutaneously or intramuscularly. When the compound is to be injected, it may be used in a sterile, aqueous or other liquid injectable medium. The pH of such injectable preparations should be from slightly acidic to slightly basic. Various materials which are normally used as media for injectable materials are also useful with the carbinol; for instance, propylene glycol, physiological saline and so forth.

The active compound may be present in our preparations at a concentration ranging from about 0.5% by weight to about 90% by weight. Lower concentrations are generally not advisable, since the volume of material which must be administered in order to supply the patient with a suitable dose becomes excessive. Although concentrations higher than 90% may be used, this is not advisable, since the taste and odor of the carbinol itself may not be properly masked to present a palatable product. Of particular value in these compositions are sweetening agents such as sucrose, dextrose, fructose, saccharin, cyclamate sodium, and other materials of this nature. These sweetening substances may be used alone or as mixtures containing sucrose and one of the synthetic, highly effective sweetening agents which are particularly valuable for this purpose. These sweetening materials may be dissolved in water, and, since the carbinol which is the active material is quite soluble in water, the pharmaceutical compositions are uniform and palatable. Various flavoring agents may also be added to assist in masking the taste of the carbinol. Such materials as oil of peppermint, oil of wintergreen, various fruit flavors, such as lime, lemon, pineapple, cherry, or combinations of these, may be used. A suitable proportion of an artificial coloring agent may be used to enhance the appearance of the product. However, this is not essential. As noted above, the oral liquid preparations should have a pH of from about 3 to about 9. The sweetened, or sweetened and flavored compositions may be dispensed by the teaspoonful to patients.

Not only may one use the methyl vinyl ethinyl carbinol in the form of liquid preparations, but the compound may also be absorbed on various inert solid carriers in which form the compound may be administered by mouth. The solid adsorbates of the active material may be formed into tablets or may be packed in capsules or other suitable pharmaceutical forms. Alternatively, the pure compound may be administered as a liquid in capsules either alone or diluted with suitable liquid carriers, such as oils or glycols and so forth.

In the treatment of humans or animals, from approximately one to ten milligrams per kilogram of body weight of the carbinol is used in the form of the compositions described above to bring about sedation or remission of other conditions susceptible to treatment by this compound. This dosage will vary somewhat with the individual or animal being treated and with the severity and type of condition in question. The toxicity of 3-methylpent-1-ene-4-yne-3-ol is very low so that there is little danger in administrating it under properly controlled conditions. The acute toxicity of the compound in mice by the oral route was found to be:

$LD_0 = 700$ mg./kg.

$LD_{50} = 1100$ mg./kg.

When the material was administered by the subcutaneous route, the $LD_0$ and $LD_{50}$ values were found to be identical with those given above.

When three groups of six male rats each were given daily intramuscular doses of 212, 106 and 53 milligrams, respectively, of the carbinol per kilogram of body weight for two weeks, there was no significant retardation of weight gained as compared to that of the control rats. At the end of two weeks, the liver, kidney, speen, heart, lungs, adrenals, bone marrow, stomach, pancreas, testis and seminal vesicles were examined for the effect of the drug. No gross or microscopic pathological changes attributable to the drug could be found. Oral administration of the carbinol in aqueous solution to dogs at levels of 44 and 88 mg./kg. of body weight caused no toxic symptoms, as determined by measurement of liver and renal functions, urinalysis and hematology, as well as gross and histopathological examination of the organs.

3-methylpent-1-ene-4-yne-3-ol has been compared as to narcosis of mice with various known compounds including phenobaribital, pentobarbital, and paraldehyde. It was found that the carbinol induced rapid onset of narcosis in these animals when administered in relatively large amounts (0.38 cc. and 0.5 cc. per mouse). The narcosis lasted from over an hour to about two hours. The induction of hypnosis was smooth and the peak effect was obtained in about 15 to 30 minutes. The induction of sleep was not preceded by excitement.

The following example is given by way of illustration only and is not to be considered as the sole embodiment of this invention. It is to be understood that protection hereof is only to be limited by the specific wording of the appended claims.

*Example*

An aqueous composition of 3-methylpent-1-ene-4-yne-3-ol was prepared using the following proportions of materials:

| | | |
|---|---|---|
| Sucrose | grams | 600 |
| Cyclamate sodium | do | 37.5 |
| 3-methylpent-1-ene-4-yne-3-ol | mls | 255 |

Sufficient water to bring the volume to 2250 mls.
Mint flavoring.

This liquid preparation of the carbinol was administered to a series of ten alcoholic patients in a dosage of approximately 12.5 grams (about 2½ teaspoons) each evening in order to induce sedation. It was found that the compound was definitely effective in bringing on sleep and in reducing the excitability and tremors normally encountered in the patients. Administration of the product over a period of one week caused no untoward reactions in the subjects.

What is claimed is:
1. A composition comprising from about 0.5% to about 90% of 3-methylpent-1-ene-4-yne-3-ol and a pharmaceutical carrier, the composition being useful as a hypnotic.
2. An orally administrable composition as claimed in claim 1 wherein the pharmaceutical carrier is a liquid, aqueous vehicle.
3. A therapeutically effective preparation comprising from about 0.5% to about 90% of 3-methylpent-1-ene-4-yne-3-ol and an orally administrable pharmaceutical carrier in capsule form, the composition being useful as a hypnotic.
4. The process of inducing hypnosis in animals, including humans, which comprises administering an effective amount of 3-methylpent-1-ene-4-yne-3-ol.

References Cited in the file of this patent
UNITED STATES PATENTS

| | | |
|---|---|---|
| 1,963,074 | Carothers et al. | June 19, 1934 |
| 2,425,201 | Orishnik | Aug. 5, 1947 |

OTHER REFERENCES

Margolin et al.: Science, vol. 114, October 12, 1951, pp. 384–385.

Papa et al.: Arch. Biochem. and Biophysics, vol. 33, No. 3, October 1951, pp. 482–483.

Wilson et al.: "Org. Chem. in Pharmacy," 1949, pp. 69–70.

Chem. Abstr., vol. 37 (1943), p. 5369$^9$.